D. RYDELL.
BARREL CART.
APPLICATION FILED MAY 19, 1914.

1,142,630.

Patented June 8, 1915.
2 SHEETS—SHEET 1.

Witnesses
J. H. Crawford.
V. B. Hillyard.

Inventor
David Rydell,
By Victor J. Evans
Attorney

D. RYDELL.
BARREL CART.
APPLICATION FILED MAY 19, 1914.

1,142,630.

Patented June 8, 1915.
2 SHEETS—SHEET 2.

Witnesses
J. H. Crawford
V. B. Hillyard

Inventor
David Rydell,
By Victor J. Evans
Attorney

UNITED STATES PATENT OFFICE.

DAVID RYDELL, OF FORESTON, MINNESOTA.

BARREL-CART.

1,142,630.  Specification of Letters Patent.  Patented June 8, 1915.

Application filed May 19, 1914. Serial No. 839,548.

*To all whom it may concern:*

Be it known that I, DAVID RYDELL, a citizen of the United States, residing at Foreston, in the county of Mille Lacs and State of Minnesota, have invented new and useful Improvements in Barrel-Carts, of which the following is a specification.

The invention has for its object the provision of a device whereby feed may be conveniently transported and supplied to stock without requiring extra handling after the feed has once been placed into the carrying receptacle.

The invention consists of a wheel truck and a receptacle pivotally mounted upon the truck in such a manner as to admit of the feed being dumped therefrom into a trough or other place of discharge.

The invention has for its object furthermore to provide a truck embodying a framework of novel structure which at the same time is simple, durable and effective for the purpose designed.

The invention consists of the novel features, details of construction and combination of parts, which hereinafter will be more particularly set forth, illustrated and claimed.

Figure 1:
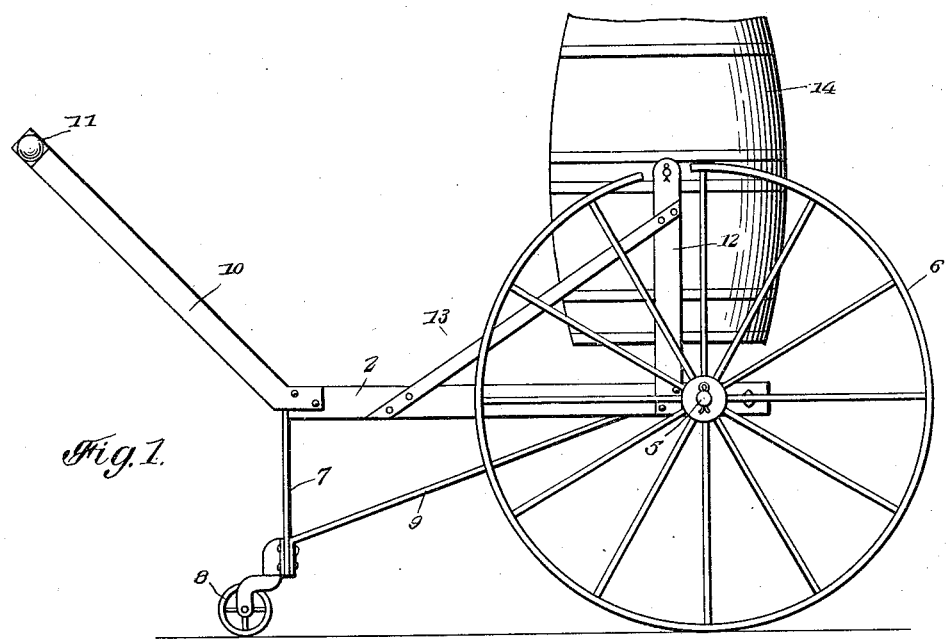
Figure 2:
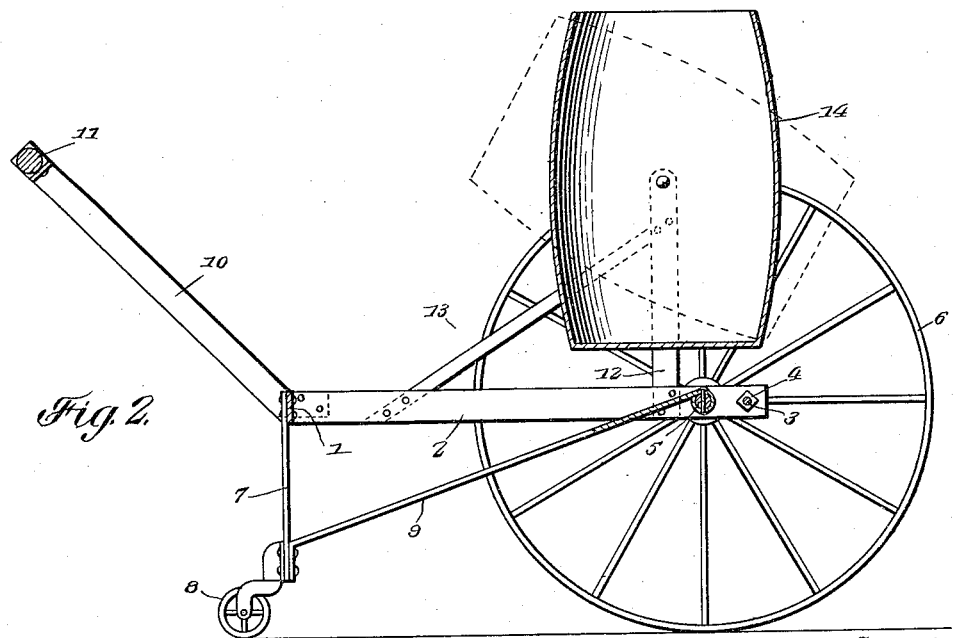
Figure 3:
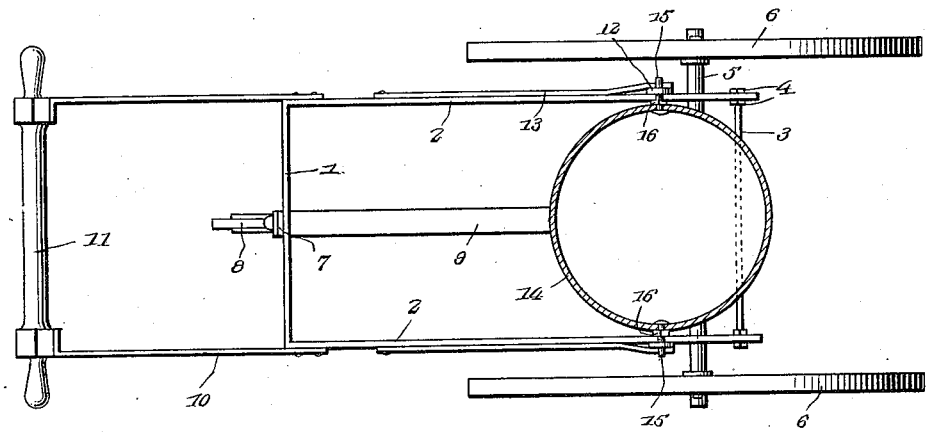
Figure 4:
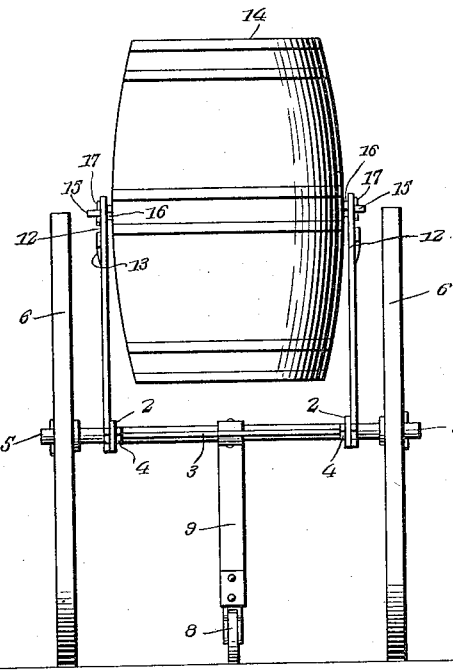

In the drawings hereto attached: Figure 1 is a side view of a barrel cart embodying the invention. Fig. 2 is a vertical central longitudinal section, the dotted lines indicating the position of the barrel or receptacle when turned to discharge the contents. Fig. 3 is a top plan view of the cart, the barrel or receptacle being a horizontal section. Fig. 4 is a rear view.

Corresponding and like parts are referred to in the following description, and indicated in all the views of the drawing, by the same reference characters.

The main frame of the truck is of U-shape and comprises a cross bar 1 and side bars 2, such frame being preferably formed of a single bar having its end portions bent in the same direction about at a right angle. A rod 3 connects the rear ends of the side bars 2 and passes through openings in such side bars and has its end portions threaded to receive a pair of nuts 4 between which the rear ends of the side bars are clamped. An axle 5 has its end portions passing through openings formed in the rear ends of the side bars 2, the projecting ends forming spindles upon which wheels 6 are mounted. A standard 7 is attached to the cross bar 1 at the middle point and is provided at its lower end with a caster wheel 8. A brace 9 connects the lower end of the standard 7 with the axle 5 and grips the latter in such a manner as to prevent turning thereof. Bars 10 are secured at their rear ends to the front portions of the side bars 2 and their front ends are fastened to a cross bar 11 which constitutes a handle bar which is grasped to admit of pulling or pushing the truck when moving the same from one place to another. Standards 12 are fastened at their lower ends to the side bars 2 and braces 13 connect the upper ends of such standards with the front portions of the side bars 2. The several members comprising the truck with the exception of the handle bar 11 are preferably of metal.

The barrel or receptacle 14 for receiving the feed is pivotally supported between the standards 12. The receptacle 14 may be of any shape or capacity and is provided at opposite sides with trunnions 15 which pass through openings in the upper ends of the standards 12. The trunnions 15 consist preferably of bolts which are passed through openings in the sides of the barrel or receptacle 14, the heads of such bolts touching the inner sides of the barrel and such bolts receiving nuts 16 which are threaded thereon and engage the outer sides of the barrel, the latter being clamped between the heads of the bolts and the nuts 16. The projecting ends of the bolts pass through openings formed in the standards 12 and receive pins 17 which retain the parts in proper position.

The feed to be transported is placed in the receptacle 14 and is trundled to the required place of discharge by pushing or pulling the truck in the manner well understood. The feed is dumped into a trough or other place of discharge by tilting the barrel on its trunnions 15 as indicated by the dotted lines in Fig. 2. When the feed is in the nature of slop and is adapted to be supplied to hogs, the receptacle is so arranged as to dump the slop into a chute which conveys the feed to a trough thereby avoiding the necessity for handling the feed after the same has once been placed in the barrel or receptacle 14.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In combination, a U-shaped frame, a rod passing through openings formed near the ends of the side bars of such frame, pairs of nuts mounted upon the end portions of the rod and clamping the side bars of the frame between them, an axle supported in the side bars of the frame and receiving wheels, a standard pendant from the cross bar of the frame and provided at its lower end with a caster wheel, and a brace between the lower end of such pendant and the axle and gripping the latter.

2. In combination, a U-shaped frame, a rod passing through openings near the ends of the side bars of such frame, pairs of nuts mounted upon the rod and clamping the side bars of the frame between them, standards extending upwardly from the frame, braces between the upper ends of such standards and frame, bars attached at their rear ends to the frame and extending forwardly, a handlebar connecting the front ends of such bars, an axle supported in the rear ends of the side bars of the frame and receiving wheels upon the projecting ends, a standard pendant from the cross bar of the main frame and provided at its lower end with a caster wheel, a brace between the lower end of such pendant and the axle and a receptacle pivotally supported between the upper ends of the before mentioned standards.

In testimony whereof I affix my signature in presence of two witnesses.

DAVID RYDELL.

Witnesses:
A. SUNDBERG,
A. D. JENKINS.

Copies of this patent may be obtained for five cents each, by addressing the "Commissioner of Patents, Washington, D. C."